(12) United States Patent
Shubs, Jr. et al.

(10) Patent No.: US 10,136,106 B2
(45) Date of Patent: Nov. 20, 2018

(54) TRAIN ASSET TRACKING BASED ON CAPTURED IMAGES

(71) Applicant: Progress Rail Locomotive Inc., LaGrange, IL (US)

(72) Inventors: Alexander Shubs, Jr., Chicago, IL (US); David M Roenspies, Elburn, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 262 days.

(21) Appl. No.: 14/954,480

(22) Filed: Nov. 30, 2015

(65) Prior Publication Data

US 2017/0155875 A1    Jun. 1, 2017

(51) Int. Cl.
H04N 7/18         (2006.01)
H04N 5/232        (2006.01)
G06T 7/00         (2017.01)

(52) U.S. Cl.
CPC ........... H04N 7/183 (2013.01); G06T 7/0044 (2013.01); H04N 5/23203 (2013.01); H04N 7/181 (2013.01); G06T 2207/10016 (2013.01); G06T 2207/20221 (2013.01); G06T 2207/30236 (2013.01)

(58) Field of Classification Search
CPC ..... H04N 7/183; H04N 7/181; H04N 5/23203
USPC ........................................................ 348/149
See application file for complete search history.

(56) References Cited

U.S. PATENT DOCUMENTS

| | | | |
|---|---|---|---|
| 7,209,817 B2 | 4/2007 | Abdel-Malek et al. | |
| 7,698,029 B2 | 4/2010 | Atmur et al. | |
| 7,805,227 B2 | 9/2010 | Welles et al. | |
| 7,845,504 B2 | 12/2010 | Davenport et al. | |
| 8,565,913 B2 | 10/2013 | Emanuel et al. | |
| 2003/0055666 A1 | 3/2003 | Roddy et al. | |
| 2006/0244830 A1 | 11/2006 | Davenport et al. | |
| 2007/0216771 A1 | 9/2007 | Kumar | |
| 2009/0037039 A1 | 2/2009 | Yu et al. | |
| 2010/0063734 A1* | 3/2010 | Kumar | B61L 25/025 701/300 |
| 2010/0148013 A1 | 6/2010 | Bhotika et al. | |
| 2012/0051643 A1 | 3/2012 | Ha et al. | |
| 2015/0008294 A1 | 1/2015 | Desbordes et al. | |
| 2015/0021444 A1 | 1/2015 | Goergen | |
| 2015/0094885 A1 | 4/2015 | Dargy et al. | |

FOREIGN PATENT DOCUMENTS

DE    102012215533    3/2014

* cited by examiner

Primary Examiner — Nam D Pham
(74) Attorney, Agent, or Firm — Miller, Matthias & Hull

(57) ABSTRACT

A system for tracking train assets is disclosed. The tracking system may include an image capture device configured to collect an image data set of a train asset and an area surrounding the train asset. Furthermore, the image data set may be associated with a time stamp and in one non-limiting example, the time stamp provides a collection time of the image data set. In some embodiments, a controller may be configured to receive the image data set and to perform an analysis of the image data set and the analysis provides a track location of the train asset and an identification of the train asset.

11 Claims, 6 Drawing Sheets

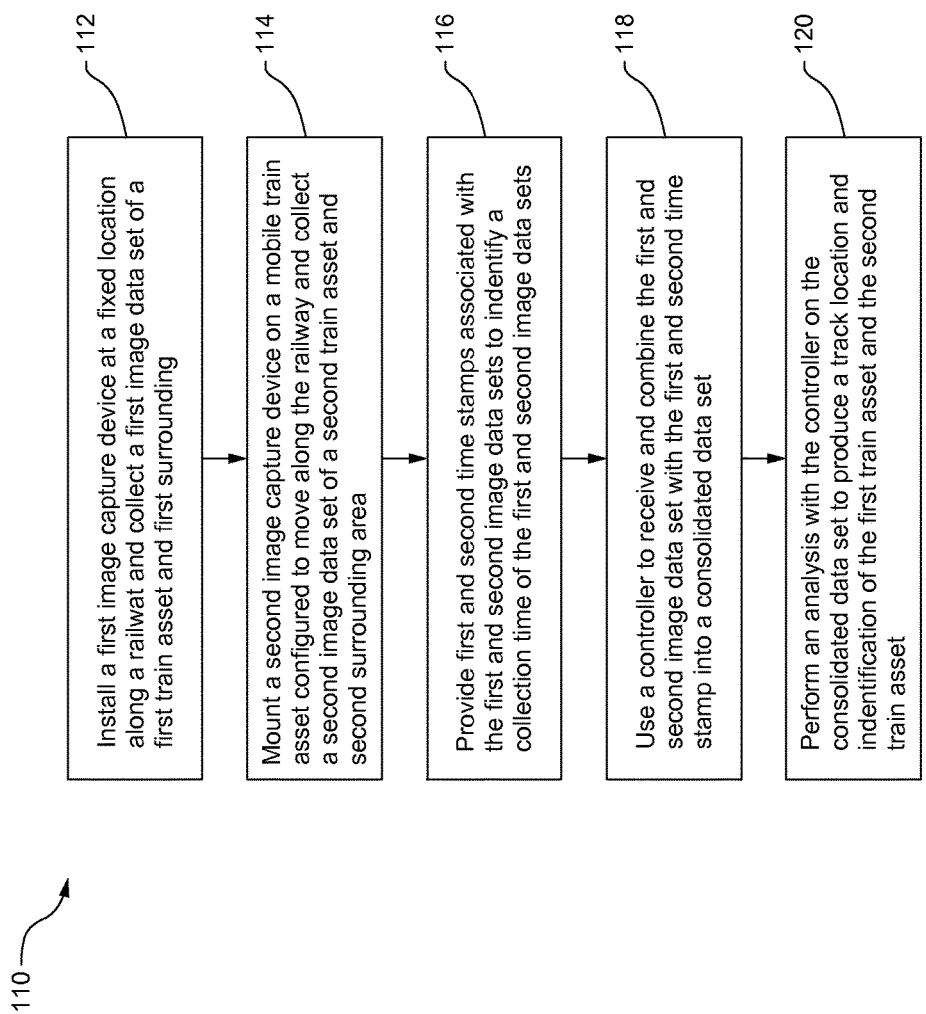

ively known as a consist and may be composed of a hundred or more train assets linked together, such as locomotives, revenue cars, wagon cars, or other known types of rail cars and train assets. In some configurations, one or more locomotives may be positioned at the front of the consist in order to pull the trailing rail cars along a railroad or track, however other configurations and positions of the locomotive are possible. The lead locomotive may serve to communicate with the other rail cars in the consist and execute operations such as increasing speed, decreasing speed or braking. Moreover, the lead locomotive may be responsible for operating a number of control systems that are used to monitor the status, location, or any other helpful metric related to train performance while traveling on railways.

TRAIN ASSET TRACKING BASED ON CAPTURED IMAGES

TECHNICAL FIELD

The present disclosure generally relates to locomotives and railcars and, more particularly, to a train asset status monitoring system for tracking the position of locomotives and railcars.

BACKGROUND

Passenger trains, freight trains or other known trains often include a long sequence of rail cars configured to travel significant distances. In some cases, the long sequence of rail cars may be referred to as a consist and may be composed of a hundred or more train assets linked together, such as locomotives, revenue cars, wagon cars, or other known types of rail cars and train assets. In some configurations, one or more locomotives may be positioned at the front of the consist in order to pull the trailing rail cars along a railroad or track, however other configurations and positions of the locomotive are possible. The lead locomotive may serve to communicate with the other rail cars in the consist and execute operations such as increasing speed, decreasing speed or braking. Moreover, the lead locomotive may be responsible for operating a number of control systems that are used to monitor the status, location, or any other helpful metric related to train performance while traveling on railways.

Moreover, in order to accommodate heavy volumes of train traffic, railways may form a complex network of tracks composed of multiple sets of train tracks which extend in several directions. Furthermore, the railway may incorporate multiple switching devices that allow the train assets to move from one set of tracks to another in order to reach a desired destination. In some situations, this switching of train assets from one set of tracks to another may make it difficult for train asset monitoring systems to accurately track such a large number of train assets at any given point in time. As a result, due to the complex network of tracks and the large number of train assets routinely traveling on the railway, an effective system is needed to accurately track the status and location of locomotives and railcars.

Previous efforts have been made to create a system for tracking train assets. However, they have not completely addressed the need to track both assets that are stationary and moving along the railway. One example can be found in U.S. Pat. No. 8,565,913 ('913 patent') which discloses an apparatus and method primarily intended for tracking assets indoors, such as in a warehouse. The apparatus for tracking assets includes, a fixed base subsystem, such as a host computer, one or more mobile subsystems that are mounted to a conveying vehicle, an optical position sensor unit and a plurality of optical position markers arranged overhead of the conveying vehicle at predetermined known positional locations.

Although the '913 patent discloses an apparatus and method for tracking the location of one or more assets, the assets being tracked are typically indoors in a warehouse setting. Furthermore, the '913 disclosure provides tracking an asset or conveying vehicle equipped with an optical sensor that is configured to identify particular optical markers. As a result, only the approximate location is determined by the camera identifying a particular marker within view.

Therefore, there is a need for a tracking system that includes the monitoring of assets that may not have an optical sensor installed.

SUMMARY OF THE DISCLOSURE

In accordance with one embodiment of the present disclosure, a system for tracking train assets is disclosed. The tracking system may include an image capture device configured to collect an image data set of a train asset and an area surrounding the train asset. Furthermore, the image data set may be associated with a time stamp and in one non-limiting example, the time stamp provides a collection time of the image data set. In some embodiments, a controller may be configured to receive the image data set and to perform an analysis of the image data set and the analysis provides a track location of the train asset and an identification of the train asset.

In another embodiment of the present disclosure, the tracking system may include a first image capture device and a second image capture device disposed along a railway. In some embodiments, the first image capture device may be configured to collect a first image data set of a first train asset and a first area surrounding the first train asset. Furthermore, the second image capture device may be configured to collect a second image data set of a second train asset and a second area surrounding the second train asset. Additionally, a first time stamp may be associated with the first image data set and a second time stamp may be associated with the second image data set and the first and second time stamp may provide a collection time of the first image data and the second image data. Moreover, a controller may be configured to receive and combine the first data set, the second data set, the first time stamp and the second time stamp into a consolidated data set. The controller may perform an analysis on the consolidated data set and provide a track location for the first train asset and the second train asset and an identification of the first train asset and the second train asset.

In yet another embodiment consistent with the present disclosure a method of tracking train assets is disclosed. The method may include installing a first image capture device at a fixed location along a railway and the first image capture device is configured to collect a first image data set of a first train asset and a first area surrounding the first train asset. Furthermore, a second image capture device may be mounted on a mobile train asset configured to move along the railway and the second image capture device is configured to collect a second image data set of a second train asset and a second area surrounding the second train asset. In some embodiments, a first time stamp associated with the first image data set and a second time stamp associated with the second image data set are provided and the first and second time stamps may provide collection times of the first and second image data sets. Moreover, a controller may receive and combine the first image data set, the first time stamp, the second image data set and the second time stamp into a consolidated data set. The controller may perform an analysis on the consolidated data set and the analysis may provide a track location for the first train asset and the second train asset and an identification of the first train asset and the second train asset.

These and other respects and features of the present disclosure will be more readily understood upon reading the following detailed description when taken in conjunction with the accompanying drawings.

BRIEF DESCRIPTION OF THE DRAWINGS

FIG. 6 is a flow chart depicting a sample sequence of steps which may be practiced in accordance with an exemplary method employing the teachings of the present disclosure.

DETAILED DESCRIPTION

Figure 1:
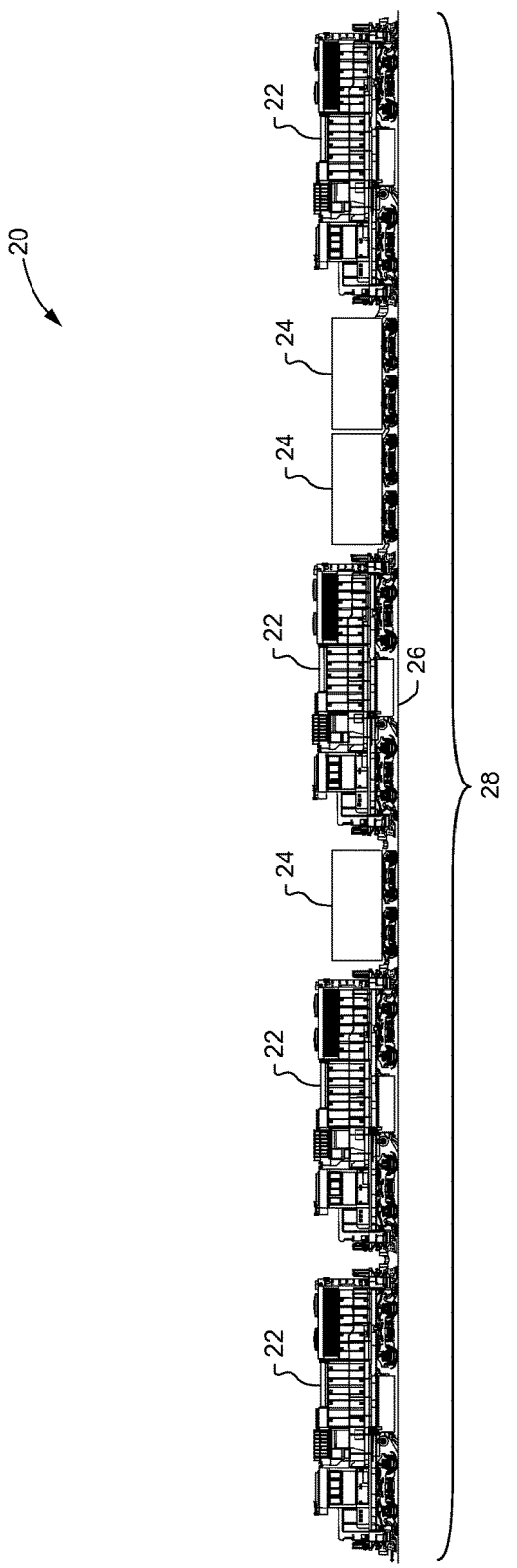
FIG. 1 is a side view of an exemplary train consist, incorporating the train asset tracking system in accordance with the present disclosure.

Referring now to the drawings and with specific reference to FIG. 1, an exemplary train configuration consistent with an embodiment of the present disclosure is generally referred to by reference numeral 20. The train 20 may have one or more locomotives 22 coupled to one or more railcars 24. As illustrated in FIG. 1, some embodiments of the train 20 may have a plurality of locomotives 22 that are communicably coupled along the length of the train 20. For example, in one non-limiting embodiment, two locomotives 22 may be located at the front of the train 20, one locomotive is located approximately in the middle of the train 20 and one locomotive 22 is located at the rear of the train 20. The train 20 is coupled together such that the lead locomotive 22 is in communication with the remote locomotives 22 and railcars 24. As a result, control commands made in the lead locomotive 22 are transmitted directly or indirectly to the remote locomotives 22 and railcars 24. A train 20 having one or more locomotives 22 communicably coupled together with one or more railcars 24 and configured to propel a train 20 down a track 26 may be referred to as a consist 28.

Figure 2:
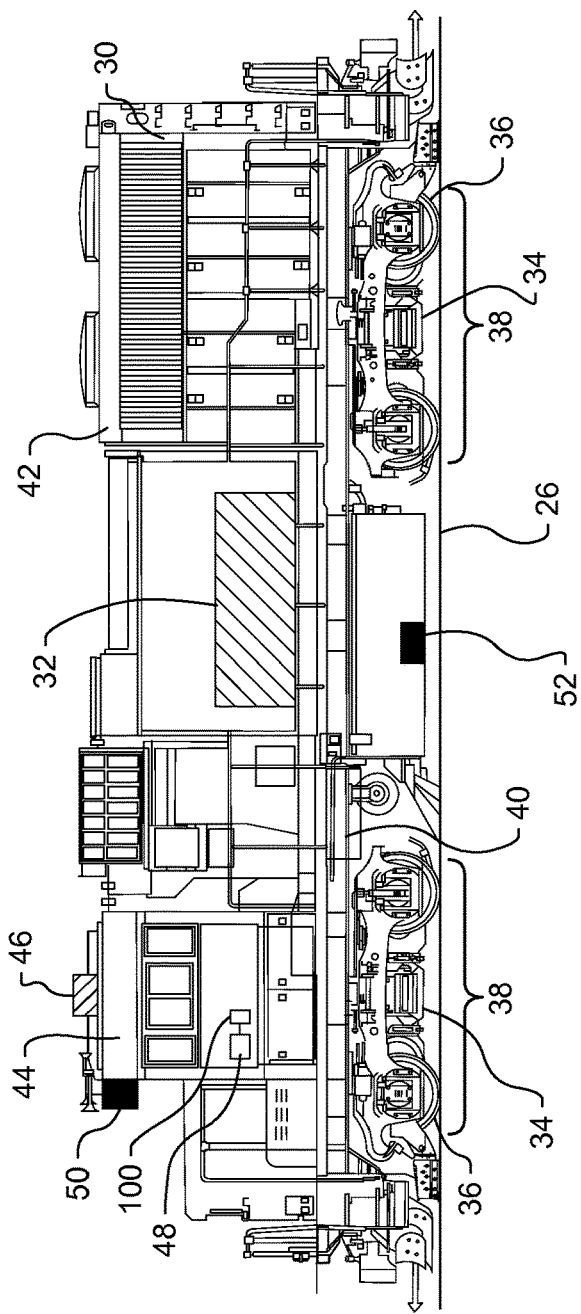
FIG. 2 is a side view of a locomotive incorporating an exemplary embodiment of the train asset tracking system in accordance with the present disclosure.

FIG. 2 provides a more detailed illustration of the locomotive 22 introduced in FIG. 1. In some embodiments, the locomotive 22 may include an engine 30 coupled to a generator 32 or other power source located on the locomotive 22. Furthermore, the engine 30 may be a diesel, steam, gas turbine, electric, hybrid or any other known type of engine capable of generating electricity for the locomotive 22 and train 20. The generator 32 may be driven by the engine 30 in order to produce electricity that is used to propel the locomotive 22 and railcars 24 down the track 26. For example, the electricity produced by the generator 32 may be used by one or more traction motors 34 that are configured to drive one or more wheels 36 attached to the locomotive 22.

The generator 32 may also provide electricity for other systems, such as control systems, status systems or any other system, that is consumes electricity during the operation of the train 20. The traction motors 34 and wheels 36 may be coupled to the locomotive 22 using a chassis or subassembly often referred to as a bogie 38 or truck. In some embodiments, the locomotive 22 may have a plurality of bogies 38 configured with a traction motor 34 and two sets of wheels 36, however, other configurations are possible. Moreover, the bogies 38 may include other components such as brakes (not shown), axles (not shown) or any other components associated with the bogies 38. The bogies 38 may be attached to a locomotive frame 40 and the frame 40 may be further configured to support a locomotive body 42, the engine 30, the generator 32 and any other locomotive 22 components associated with the locomotive 22. Furthermore, the body 42 may have a cab 44 that forms an enclosure for an operator and other personnel. Moreover, in some embodiments the cab may contain a set of controls (not shown) and other instrumentation (not shown) of the locomotive and an operator may use the controls (not shown) and instrumentation (not shown) the operate the locomotive 22 and train 20.

In one non-limiting example, the locomotive 22 may have an image capture device 46, such as a digital camera or any other known image sensor, mounted on the exterior of the body 42. While the illustration provided in FIG. 2 shows one image capture device 46 mounted on a top surface of the body 42 it will be appreciated that more than one image capture device 46 may be placed in various locations of the locomotive 22. The image capture device 46 may be configured to take a series of still images of the locomotive 22 and the surrounding area of the train 20. In some cases, the images of the surrounding area of the train 20 may include images of the track 20, images of other railcars 24 or any other train assets present within the image capture device 46 field of view. Additionally or alternatively, the image capture device 46 may be a capable of collecting a continuous video stream of the locomotive 22 and the surrounding area the train 20, however other capabilities and configurations of the device may be used. In some embodiments, the image capture device 46 may be remotely coupled to a control module 48 located inside the cab 44. For example, the image capture device 46 and the control module 48 may communicate over a wireless network, such as a cellular network, computer network (e.g. wi-fi), a satellite network or any other known communication method. Moreover, in some embodiments the control module 48 may incorporate a series of buttons (not shown), a series of dials (not shown) a touchscreen (not shown), a display device (not shown) or other control interface that may allow an operator to direct the image capture device 46 to perform certain functions. For example, the operator may use the control module 48 to view captured image data on the display device (not shown), start and/or stop image data collection, adjust the focus, optimize the lighting exposure, increase/decrease the zoom, or any other necessary adjustments of the image capture device 46. In some embodiments, the image capture device 46 may provide real-time image data to the display device (not shown) for the operator to view. Moreover, the image capture device 46 may be rotatably attached to the exterior of the locomotive 22 and the control module 48 is used to move the image capture device 46 up, down, left or right and adjust the image area or field of view of the image capture device 46.

The control module 48 may also incorporate or be coupled to a storage device (not shown) such as a hard drive, flash drive, optical drive (i.e. digital video disc or blu-ray) or any other known storage medium. Moreover, the control module 48 may further incorporate or be coupled to a computing device (not shown) which may be capable executing computer related functions as well as facilitate the storage and/or transfer of the data collected by the image capture device 46.

Additionally, the locomotive 22 may be equipped with additional sensors that are installed for monitoring, controlling and operating the locomotive 22 and the train 20. For example, an active position sensor 50, such as a global positioning system unit (GPS), may be installed on the locomotive 22 and used to provide a location or other known navigation function of the locomotive 22 and/or train 20. In some embodiments, the active position sensor 50 may be used to detect and communicate with a network of satellites (not shown) and the sensor/satellite communication may provide a continuous, real-time location of the locomotive 22 and any other train assets connected to or otherwise associated with the locomotive 22. Additionally or alternatively, one or more automatic equipment identification tags 52 (AEI) may be located on various positions of the locomotive 22, such as, the bogie 38, the frame 40, the body 42 or other location of the locomotive 22. In some embodiments, the AEI tags 52 may be radio-frequency identification tags (RFID) or other known identification devices that are part of a monitoring or control system used in the operation of various train assets (e.g. locomotives 22 and railcars 24).

Figure 3:
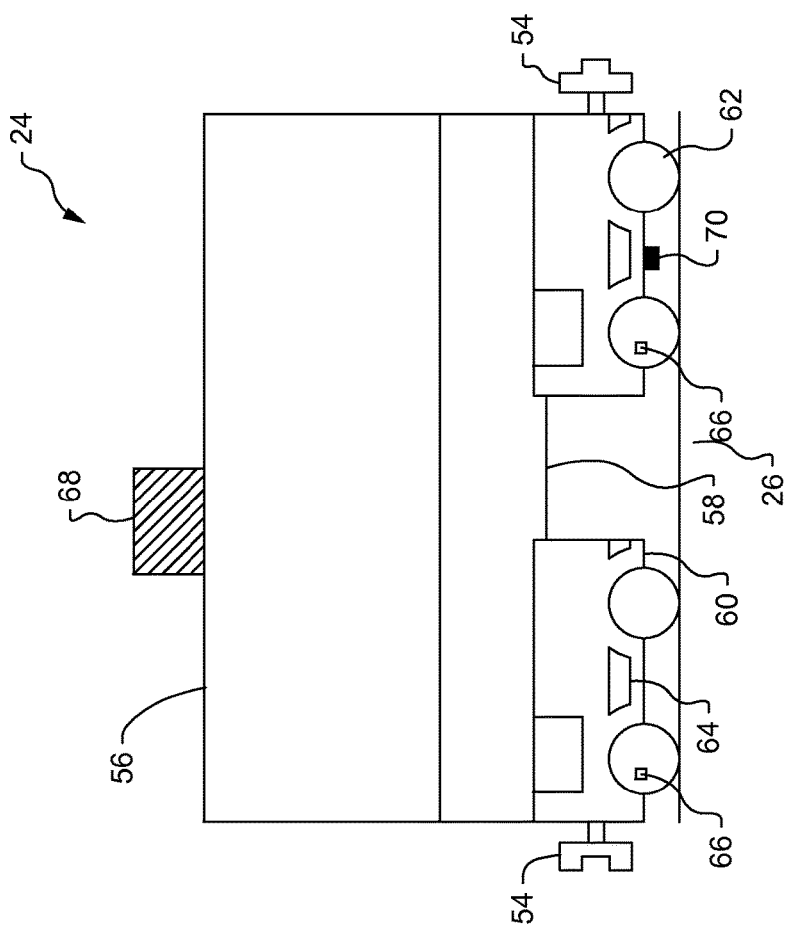
FIG. 3 is a side view of a railcar incorporating an exemplary embodiment of the train asset tracking system in accordance with the present disclosure.

FIG. 3 illustrates an exemplary railcar 24 or wagon of the train 20. As illustrated in FIG. 1, during train 20 assembly, one or more railcars 24 may be attached behind one or more locomotives 22 using an attachment mechanism 54 located on either end of the railcar 24. The attachment mechanism 54 not only serves as a mechanical link but may provide a communication link (not shown) between the railcar 24 and locomotive 22 or other train assets. The railcar 24 may be configured with a body 56 that is mounted onto a frame 58. In some embodiments, the body 56 may be configured to carry passengers, while in other embodiments the body 56 may be configured to carry freight, however other configurations are possible. Moreover, the frame 58 and body 56 may be supported by one or more bogies 60 or trucks and the bogies 60 are typically located at either end of the railcar 24 and configured with one or more pair of wheels 62. Each pair of wheels 62 may be coupled by an axle (not shown) and the wheels 62 may be further configured to mate with the rail 26. In some embodiments, the railcar 24 may be equipped with brakes 64 and one or more wheel sensors 66. The wheel sensors 66 may be a Hall-effect sensor, a magnetoresistive sensor, an accelerometer, or any other type of sensor configured to monitor the speed and rotation of the wheels 62. Moreover, the output from the wheel sensor 66 may transferred from the railcar through the communication link (not shown) and received by the control module 48 or other train monitoring system (not shown) located in the cab 44 of the locomotive 22. Furthermore, the brakes 64 may be controlled by the train 20 operator to adjust the speed of the train 20. The controls (not shown) for the brakes 64 may be located in the cab 44 of the locomotive 22.

Additionally, like the locomotive 22 described above, the railcar 24 may be equipped with an image capture device 68 that is mounted on the body 56 of the railcar 24. In some embodiments, the image capture device 68 is mounted on the top of the body 56, alternatively or additionally, a plurality of image capture devices 68 may be mounted on the side of the body 56, the frame 58 or any other useful location of the railcar 24. In one non-limiting example, the image capture device 68 may be capable of taking a series of still images of the locomotive 22, railcar 24 and/or area surrounding the train 20. In some cases, the images of the surrounding area of the train 20 may include images of the track 20, images of other railcars 24 or any other train assets present within the image capture device 68 field of view. Additionally or alternatively, the image capture device 68 may be a capable of collecting a continuous video stream of the locomotive 22, railcar 24 and/or the area surrounding the train 20, however other capabilities of the device may be used. In some embodiments, the image capture device 68 may be remotely coupled to a control module 48 located inside the cab 44. For example, the image capture device 68 and the control module 48 may communicate over a wireless network, such as a cellular network, computer network (e.g. wi-fi), a satellite network or any other known communication method. Furthermore, the control module 48 may allow the operator or other personnel of the locomotive 22 to remotely control and/or operate the image capture device 68. In some embodiments, the control module 48 may allow the operator to view image data, or to start and/or stop the collection of images. Alternatively, or additionally, the control module 48 may be used to make adjustments to the image capture device 68 such as changes to the, focus, lighting, zoom, image area or any other available adjustments. Moreover, the image capture device 68 may be rotatably attached to the exterior of the railcar 24 and the control module 48 is used to move the image capture device 68 up, down, left or right and adjust the image area or field of view of the image capture device 46.

The control module 48 may also incorporate and/or be coupled to a storage device (not shown) such as a hard drive, flash drive, optical drive (i.e. digital video disc or blu-ray) or any other known storage medium. Moreover, the control module 48 may further incorporate or be coupled to a computing device (not shown) which may facilitate the transfer and storage of the data collected by the image capture device 68 to the storage device (not shown). In some embodiments, the control module 48 may be communicably coupled to additional sensors (not shown) that are mounted on the locomotive 22 and/or railcar 24. For example, a global positioning system unit (GPS) (not shown) may be mounted on the railcar 24 and used to provide a location or other known navigation function of the railcar 24 or train 20. However, in some embodiments the railcar 24 may not be equipped with a GPS unit (not shown) and instead rely on the active position sensor 50 and GPS data provided by one or more locomotives 22 of the train 20. In addition to using active position sensors 50 on the locomotive 22, the railcar 24 may be equipped with one or more automatic equipment identification (AEI) tags 70 mounted on the body 56, frame 58, bogie 60 or other location of the railcar 24. The AEI tags 70 may be radio-frequency identification tags (RFID) or other known identification devices used for monitoring locomotives 22 and/or railcars 24.

Figure 4:
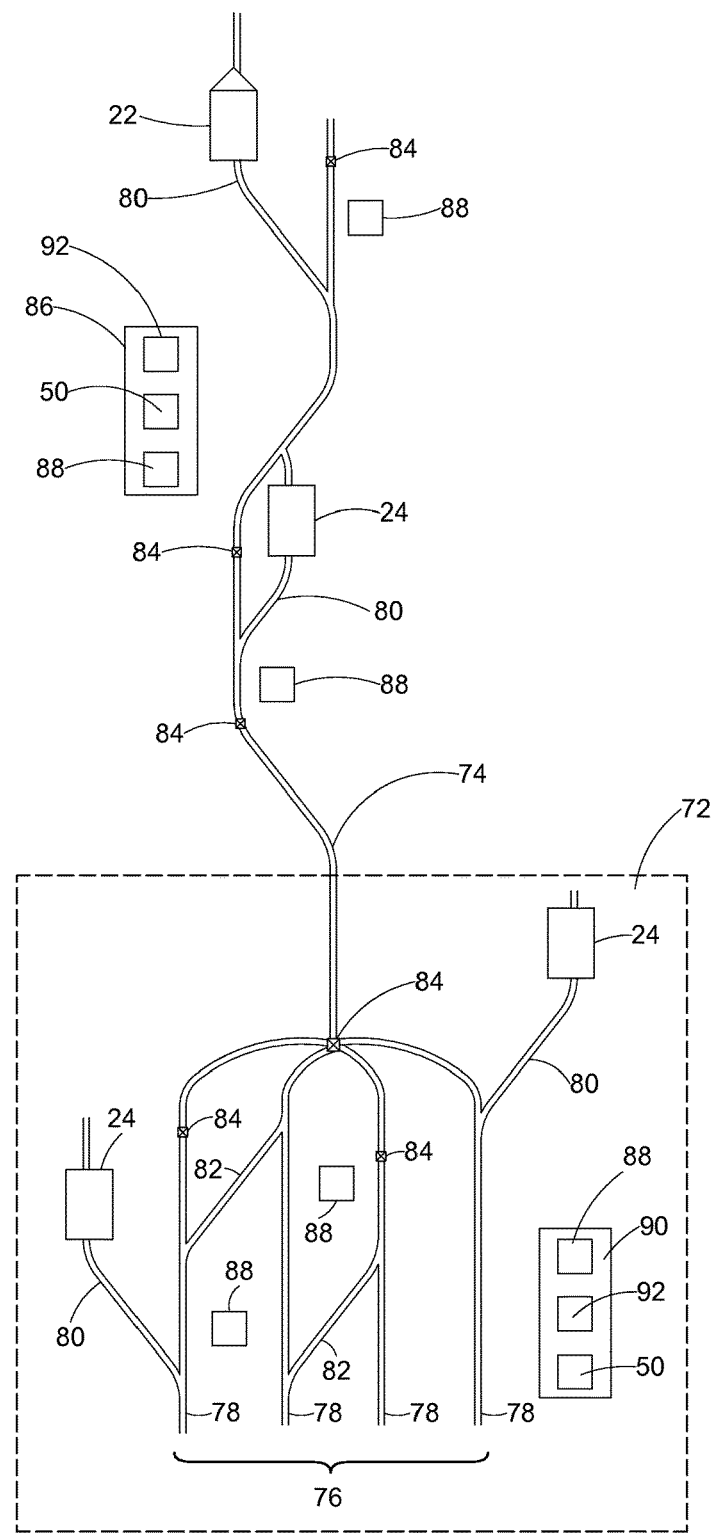
FIG. 4 is a schematic illustration of a railyard and mainline incorporating an exemplary embodiment of the train asset tracking system in accordance with the present disclosure.

FIG. 4 is a schematic of a railyard 72 and railway or main line 74 consistent with an embodiment of the present disclosure. In one non-limiting embodiment, the railyard 72 may contain a track network 76 used for configuring, storing, sorting, loading, unloading, repairing or any other task associated with locomotives 22, railcars 24 and trains 20. In some embodiments, the track network 76 may be configured such that a plurality of rails 78 are positioned substantially parallel to each other, however other configurations of the track network 76 are possible. Additionally, the track network 76 may include one or more sidings 80 and/or crossovers 82 as part of the track network 76. In one non-limiting example, the sidings 80 are a portion of rail 78 that branches off from the track network 76 or main line 74 and may be used to store or park a locomotive 22, a railcar 24 or any other train asset. Furthermore, the crossovers 82 may serve to connect one or more parallel rail sections 78 of the track network 76 and allow a locomotive 22, railcar 24 or other train asset to move from one rail section 78 to another. In some cases, one or more switches (not shown) may be used to help guide the locomotive 22, railcar 24 or other train asset from the rail section 78 or mainline 74 onto the siding 80 or crossover 82. As such, the track network 76, including sidings 80, crossovers 82 and switches (not shown) may be relied upon to move and rearrange locomotives 22, railcars 24 and other train assets during the assembly of a train 20.

Once the train 20 has been assembled and ready for departure it may exit the railyard 72 and proceed to travel down the main line 74 to a selected destination. In some embodiments, the main line 74 may have a single set of tracks on which the locomotives 22, railcars 24 and other train assets (not shown) may travel. Furthermore, the main line 74 may be configured to provide a travel pathway for a plurality of trains 20 that may be located along different locations of the main line 74 at any given point in time. In some embodiments, the main line 74 may also have one or more sidings 80 that branch off from the main line 74. These sidings 80, connected to the main line 74, may be used to store locomotives 22, railcars 24 or any other train asset. Alternatively, or additionally, the sidings 80 may be used to alter the original train 20 configuration and/or change the order of the locomotives 22, railcars 24 or other train assets. Furthermore, one or more locomotive 22, railcar 24 or other train asset may be detached from the train 20 and moved from the main line 74 to the siding 80. This may be done, for example, due to an operational failure, to make repairs, the locomotive 22 or railcar 24 is no longer needed or for any other reason related to the operation of the train 20.

The complexity of the track network 76, sidings 80 and crossovers 82 within the railyard 72 and along the main line 74, may make it difficult to accurately track locomotives 22, railcars 24 or other train assets. In some situations, AEI systems may be used to help monitor the movement of locomotives 22, railcars 24 and other train assets. For example, the AEI system may use AEI tags 52, 70 that are mounted on the locomotives 22 and railcars 24 along with AEI reading units 84 deployed at fixed locations along the main line 74, such as at wayside stations 86 or installed along the mainline 74 and on the rails 78 within the railyard. Additionally, handheld or portable AEI reading units 84 may located throughout the railyard 72 or along the mainline 74 to monitor locomotives 22 and railcars 24 as they are moved around. When locomotives 22 and railcars 24 are moved by an AEI reading unit 84 the AEI tags 52,70 may be detected. As a result, the time and location the AEI tag 52,70 was scanned may be used to determine a position of the particular locomotive 22 and/or railcar 24 at the time the AEI tag 52,70 was detected. Furthermore, in certain instances, the geographic location of the AEI reading units located along the main line 74 and wayside stations 86 may be known, thus when the AEI tag 52,70 is detected the geographic location at the time of detection may also be determined.

Furthermore, one or more image capture devices 88 may be fixed along the main line 74 at locations, such as, wayside stations 86, sidings 80 or any other location. Additionally, one or more image capture devices 88 may be mounted on a control center 90 or other convenient locations in or near the railyard 72. In some embodiments, the image capture devices 88 may be similar to the image capture devices 46,68 mounted on locomotives 22 and/or railcars 24 described above. In some embodiments, the image capture device 88, may be a digital camera or any other known image sensor capable of taking a series of still images and/or a continuous video stream of the surrounding area of the wayside station 86, the main line 74, the control center 90 or any other location within the field of view of the image capture device 88. Furthermore, the image capture device 88 may be communicably coupled to the control module 92 located inside the wayside station 86 and/or control center 90. In some embodiments the control module 92 may incorporate a series of buttons (not shown), a series of dials (not shown) a touchscreen (not shown), a display device (not shown) or other control interface that may allow an operator to direct the image capture device 88 to perform certain functions. For example, the operator may use the control module 92 to view image data, start and/or stop image data collection, adjust the focus, optimize the lighting exposure, increase/decrease the zoom, or any other necessary adjustments of the image capture device 88. Moreover, the image capture device 88 may be rotatably attached to the wayside station 86 and control center 90. The operator may use the control module 92 to move the image capture device 88 up, down, left or right and adjust the image area of the image capture device 88.

The control module 92 may also incorporate or be coupled to a storage device (not shown) such as a hard drive, flash drive, optical drive (i.e. digital video disc or blu-ray) or any other known storage medium. Moreover, the control module 92 may further incorporate or be coupled to a computing device (not shown) which may facilitate the storage and/or transfer of the data collected by the image capture device 88.

The image capture devices 88 installed at various places along the main line 74 and in the railyard 72 (e.g. wayside stations 86, control center 90, sidings 80) may be configured to collect still images or video feeds of trains 20 and other rail assets that pass within the field of view of the device. Moreover, the control modules 92 located in the wayside stations 86 and control centers 90 may be capable to communicate with the control modules 48 installed on locomotives 22 through a wireless network, such as a cellular network, computer network (e.g. wi-fi), a satellite network or any other known communication method. As such, in some embodiments it may be possible for image data collected by the image capture devices 46,48 mounted on locomotives 22 and railcars 24 to be shared with the control module 92 located in the wayside stations 86 and control centers 90.

Figure 5:
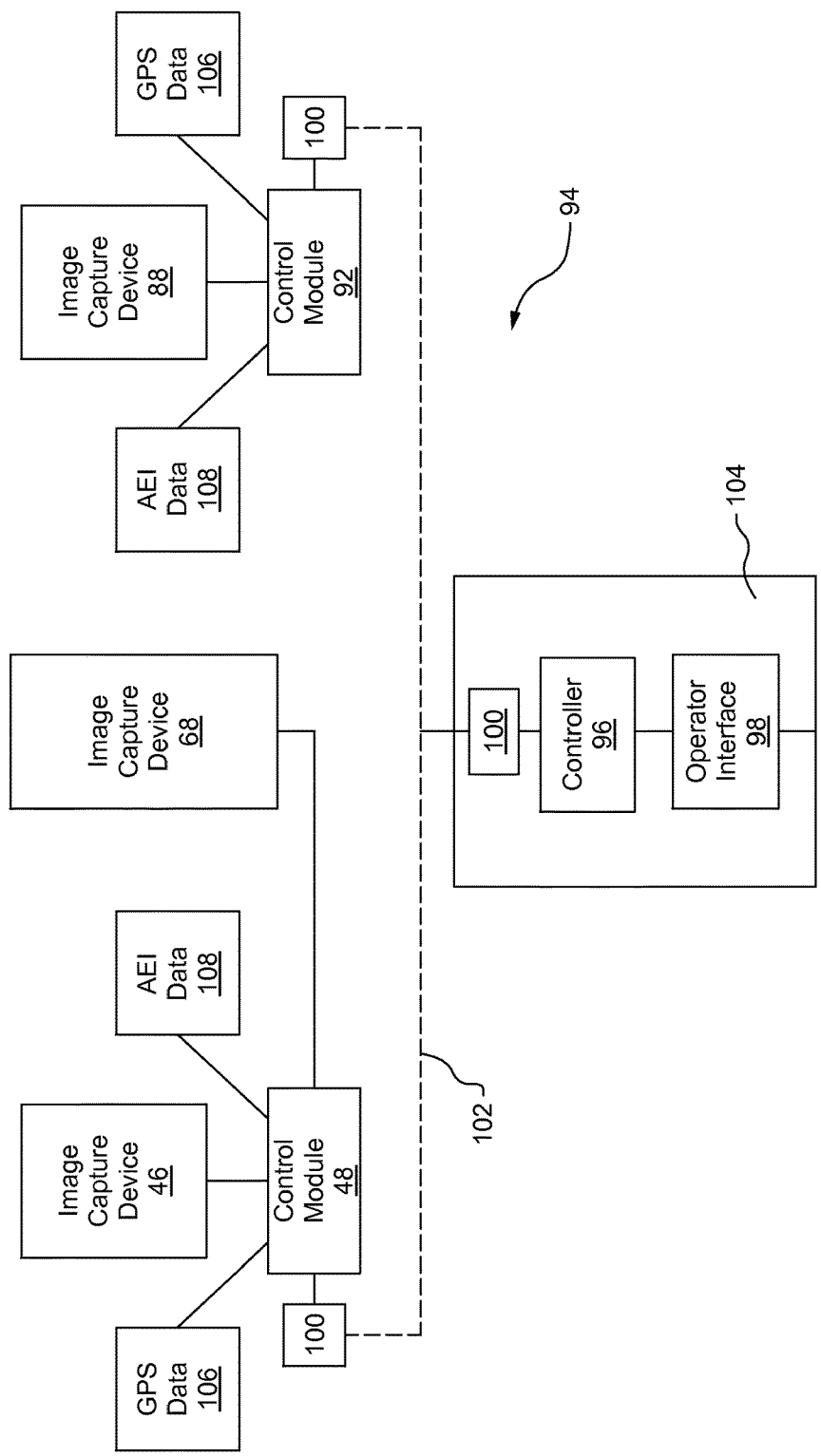
FIG. 5 is a block diagram illustrating an exemplary embodiment of the train asset tracking system in accordance with the present disclosure.

FIG. 5 is a block diagram of a train asset tracking system 94 configured to collect and analyze data related to locomotives 22, railcars 24 or other train assets. In some embodiments, the train asset tracking system 94 may include one or more image capture devices 46, 68, 88 and a controller 96 that is remotely coupled to the image capture devices 46, 68, 88 using a wireless network, such as a cellular network, computer network (e.g. wi-fi), a satellite network or any other known communication method. The controller 96 may be a computing device capable of processing data and performing other tasks related to the identification and tracking of train assets. Furthermore, the controller 96 may include or be coupled to a storage medium, such as, a hard drive, flash drive, optical drive (i.e. digital video disc or blu-ray) or any other known storage medium. Additionally, the controller 96 may be configured with, among other things, an operator interface 98 and a communications device 100. The operator interface 98 may include a monitor, projector, or any other appropriate type of computing display device. Furthermore, the operator interface 98 may also be configured with, for example, a series of dials, a keyboard, a mouse, a touch screen or other type of input device that will allow an operator or other user to input commands or other information into the controller 96. In some embodiments, an operator may use the operator interface 98 to carry out a variety of tasks such as, review previously saved data, access data at another location (e.g. control module 48, 92) or send data to another location (e.g. locomotive 22, wayside station 86 or control center 90) or any other tasks related to the train asset tracking system 94.

In some embodiments, the train asset tracking system 94 may form a network 102 between the control modules 48, 92, the image capture devices 46, 68, 88, and the controller 96. The control modules 48, 92 and the controller may each have a communication device 100 that allows communication through a wireless communication network such as a cellular network, computer network (e.g. wi-fi), a satellite network or any other known communication method. As a result, the train asset tracking system 94 will have image data capture capability at fixed known locations (i.e. wayside stations 86 and control centers 90) and mobile locations along the main line 74 (i.e. locomotives 22 and railcars 24). Additionally, the communication network 102 may allow data collected from a plurality of image capture devices 46, 68, 88 to be sent to the controller 96 that is located in a remote office 104 or other operational location where the image data collected from the image capture devices 46, 68, 88 may be further analyzed.

In some embodiments, the controller 96 located in the remote office 104 may be configured with an image recognition software and/or other analysis software tool to analyze the image data collected by the image capture devices 46,68,88. The image recognition and/or other analysis software may be configured to recognize and identify specific train assets. In one non-limiting example, an image capture device 46, 68, 88 may be deployed at a fixed location, such as a wayside station 86 or control center 90 and configured to collect image data of passing trains 20. Alternatively, or additionally, the image capture devices 46, 68 may be mounted on locomotives 22 and/or railcars 24 and configured to collect image data of other passing train assets (e.g. locomotives 22 and railcars 24). In some embodiments, the locomotives 22 and/or railcars 24 are capable of collecting data while moving or in a stationary position. Put another way, the image capture devices 46, 68 that are mounted on locomotives 22 and or railcars 24 may be configured to collect image data of any train asset that is moving relative to the locomotive 22 and/or railcar 24 on which the image capture device 46, 68 is mounted. Such a configuration may allow the image capture devices 46, 68 mounted on moving locomotives 22 or railcars 24 to collect images of another train asset that is stationary and located on a track siding 80 or on an adjacent track (not shown), moving on an adjacent track (not shown) or any other condition that is within the image capture device 46, 68 field of view.

Furthermore, the train asset tracking system 94 data analysis may be capable of identifying specific track locations of the specific train asset (e.g. locomotives 22 and railcars 24) captured by the image capture devices 46, 68, 88. To identify a specific track location the train asset tracking system 94 may incorporate a time-stamp along with the image data that is collected and correlate the captured image data and time stamp with position information. In some embodiments, this may allow the train asset tracking system 94 to determine the precise location along the mainline 74 where the image data was collected.

Data collected by the train asset tracking system 94 may be supplemented or correlated with data collected by other sensors and/or monitoring systems. For example, most locomotives 22, wayside stations 86 and control centers 90 that are equipped with the image capture devices 46, 88 are also equipped with active position sensors 50, such as GPS units. The GPS data 106 collected by the active position sensors 50 may be combined with the image data collected by image capture devices 46, 68 mounted on locomotives 22, wayside stations 86 and/or control centers 90. As a result, the train asset tracking system 94 may be able to use the GPS data 106 of where the image data is collected to provide the location of a specific passing train asset at the time the image data was collected. In some embodiments, this may be especially helpful in tracking railcars 24 because many railcars 24 are not equipped with active position sensors 50

Additionally, or alternatively, the train asset tracking system 94 may correlate data collected by AEI systems or other train 20 monitoring systems. As discussed above, the locomotives 22, railcars 24 and other train assets, may be equipped with AEI tags 52, 70, such as RFID tags or other sensors. Furthermore, AEI reading units 84 may be deployed at known, fixed locations along the main line 74 and railyard 72. As such, AEI location data 108 collected from the AEI reading units 84 may be received by the control modules 48, 92 and then sent to the controller 96 through the network 102 established between the control modules 48, 92 and the controller 96. As a result, the AEI data 108 may also be correlated with image data collected by the and image capture device 46, 68 to provide the location of a specific passing train asset at the time the image data was collected.

INDUSTRIAL APPLICABILITY

In general, the asset tracking system based on captured images of the present disclosure may find applicability in many industries, including but not limited to, the monitoring and tracking of train assets as they move about a railway. Train asset monitoring systems may pose some difficulties because monitoring and tracking systems require accurate information to adequately track assets as they travel around a railway. Furthermore, tracking systems may be relied upon to provide positions for a plurality of train assets at any given point in time.

Providing accurate position information can prove to be a difficult task, especially in situations where an active position sensor, such as a GPS unit, is not installed on a particular asset, is inoperative, out of range or any other operational failure. Furthermore, position determination may be difficult if the asset is not moving and therefore not passing AEI or other train asset identification systems. Such a situation may occur, for example where a locomotive, railcar or other train asset is not moving or separated from a train and left on a siding. As a result, there is a need for systems that are capable of tracking the positions and other status indicators of locomotives, railcars and other train assets under such conditions as described above.

Referring to FIG. 6, an exemplary flowchart is illustrated describing a method 110 which may be followed to track locomotives 22, railcars 24 or other train assets, as described in the present disclosure. The first step 112 of the method 110 may require installing a first image capture device 88 at a fixed location, such as a wayside station 86 or control center 90, along a railway or mainline 74. Furthermore, the first image capture device 88 may be configured to collect a first image data set of a plurality of train assets (e.g.

locomotives 22 and railcars 24) and the surrounding area as they pass by the first image capture device 88.

According to the next step 114 of method 110 a second image capture device 46, 68 may be mounted on a mobile train asset, such as a locomotive 22 and railcar 24. Moreover, the second image capture device 46, 68 may be configured to collect a second image data set of a plurality of second train assets and the surrounding area, as the second train asset passes by the second image capture device 46, 68. In one non-limiting example, the second image capture device 46, 68 may be configured to capture image data from any train assets (e.g. locomotives 22 and railcars 24) that are moving relative to the train asset mounted with the second image capture apparatus 46, 68. Furthermore, in some embodiments, the second image capture device 46, 68 may capture image data of a train asset that is stationary and located on a track siding 80.

Furthermore, step 116 may provide a first and second time stamp that is associated with the collection of the first and second image data sets respectively. In some embodiments, the first and second time stamps may provide a collection time of the first and second image data sets. Furthermore, the time stamp may be useful in tracking locomotives 22, railcars 24 or other train assets because the time stamp data may be correlated with the identification of a specific locomotive 22 or railcar 24 at a specific position along the railway or mainline 74. Moreover, in the next step 118 a controller 96 may be used to receive the first and second image data sets from the first and second image capture devices 46, 68, 88. In one embodiment, the first and second image data may be wirelessly communicated over a communications network formed between the controller 96 and a control module 48, 92 that is coupled to the first and second image capture devices 46, 68, 88. Furthermore, upon receiving image data and time stamp data the controller 96 may combine the first image data set, the first time stamp, the second image data set and the second time stamp to create a consolidated data set.

In the final step 120, the controller 96 may perform an analysis on the consolidated data set to produce a track location of the locomotives 22 and railcars 24 viewed by the image capture devices 46, 68, 88. Furthermore, the analysis on the consolidated data set may additionally, or alternatively identify the specific locomotives 22 and/or railcars 24 viewed by the image capture devices 46, 68, 88. In one non-limiting example the analysis performed by the controller may use an image recognition algorithm to help identify the specific locomotives 22 and or railcars captured in the first and second image data files, however other analysis methods may be used. Additionally, or alternatively, the analysis may correlate the time stamp data and the image recognition algorithm with position information received by the controller 96. As a result, the train asset tracking system 94 may be able to determine an exact location where the image data files were collected of specific locomotives 22 and/or railcars 24.

It will be appreciated that the tracking and monitoring the position and activity of train assets can be difficult. Furthermore, it is possible that other train asset tracking systems may require sensors, such as a GPS unit that are not installed on every locomotive, railcar or other train asset. Furthermore, other rail asset management systems may require the assets to be moving along the railway to provide accurate tracking data. As a result, an improved train asset tracking system is needed that can track the position or other status indicators of a train asset when other monitoring systems fail.

Train asset monitoring systems rely on accurate information relative to the assets they are tracking. In operation, the train asset monitoring system may be responsible for keeping track of the positions of hundreds or even thousands of assets at any given point in time. A tracking system, such as the one described in the present disclosure, may be installed on individual train assets and at fixed locations along the railway and used to identify and determine a position of the individual train assets. The foregoing embodiments of the present disclosure are provided for illustration and not for limitation.

It will be apparent to those skilled in the art that various modifications and variations can be made to the disclosed train asset tracking system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A system for tracking train assets, the system comprising:
    a first image capture device disposed along a railway, the first image capture device being configured to collect a first image data set of a first train asset and a first surrounding area of the first train asset;
    a second image capture device disposed along the railway, the second image capture device being configured to collect a second image data set of a second train asset and a second surrounding area of the second train asset;
    a first time stamp associated with the first image data set;
    a second time stamp associated with the second image data set, the first time stamp providing a first collection time of the first image data set and the second time stamp providing a second collection time of the second image data set; and
    a controller configured to receive and combine the first data set, the second data set, the first time stamp and the second time stamp into a consolidated data set, the controller performing an analysis on the consolidated data set and providing a track location for the first train asset and the second train asset and an identification of the first train asset and the second train asset.

2. The system of claim 1, wherein the first image capture device is deployed at a fixed location along the railway, the first image capture device configured to collect the first image data set as the first train asset passes by the first image capture device.

3. The system of claim 1, wherein the second image capture device is mounted on a mobile train asset moving along the railway and the second image capture device is configured to collect the second image data set as the second train asset passes by the second image capture device.

4. The system of claim 1, wherein the first image capture device and the second image capture device are configured to collect a continuous video stream of the first image data set and the second image data set.

5. The system of claim 1, wherein the analysis of the consolidated image data set uses an image recognition and time stamp algorithm to provide a track location for the first train asset and the second train asset and an identification of the first train asset and the second train asset.

6. The system of claim 1, wherein the first image capture device is operatively coupled to a first control module, the second image capture device is operatively coupled to a second control module, the first control module and the second control module are used to start and stop a collection of the first image data set and the second image data set and to adjust a field of view of the first image capture device and the second image capture device.

7. The system of claim 6, wherein the first control module is coupled to a first storage device and the first image data set is saved to the first storage device, the second control module is coupled to a second storage device and the second image data set is saved to the second storage device, the first control module and the second control module communicate wirelessly with the controller, sending the first image data set and the second image data set to the controller located in a remote office.

8. The system of claim 6, wherein the first image capture device is communicably coupled to a first active position sensor, the second image capture device is communicably coupled to a second active position sensor and the controller uses the first active position sensor, the second active position sensor, the first image data set and the second image data set during the analysis performed by the controller.

9. The system of claim 8, wherein the first image capture device is communicably coupled to a first automatic equipment identification system, the second image capture device is communicably coupled to a second automatic equipment identification system and during the analysis the controller combines a first data set produced by the first automatic equipment identification system with the first image data set and a second data set produced by the second automatic equipment identification system with the second image data set.

10. A method of tracking train assets, the method comprising:
   installing a first image capture device at a fixed location along a railway, the first image capture device configured to collect a first image data set of a first train asset and a first area surrounding the first train asset;
   mounting a second image capture device on a mobile train asset moving along the railway, the second image capture device configured to collect a second image data set of a second train asset and a second area surrounding the second train asset;
   providing a first time stamp associated with the first image data set and a second time stamp associated with the second image data set, the first time stamp providing a collection time of the first image data set and the second time stamp providing a collection time of the second image data set;
   using a controller to receive and combine the first image data set, the first time stamp, the second image data set and the second time stamp into a consolidated data set;
   performing an analysis with the controller on the consolidated data set to provide a track location for the first train asset and the second train asset and an identification of the first train asset and the second train asset.

11. The method of claim 10, wherein the first image data set is a first continuous video stream and the second image data set is a second continuous video stream, the consolidated image data set uses an image recognition and time stamp algorithm to provide a track location of the first train asset and the second train asset and an identification of the first train asset and the second train asset;
   the first image capture device is operatively coupled to a first control module, the second image capture device is operatively coupled to a second control module, the first control module and the second control module are communicably coupled to the controller, the first control module and the second control module wirelessly send the first image data set and the second image data set to the controller located in a remote office; and
   the first image capture device is communicably coupled to a first active position sensor and a first automatic equipment identification system, the second image capture device is communicably coupled to a second active position sensor and a second automatic equipment identification system, the analysis performed by the controller correlates the consolidated data set with an output from the first active position sensor, an output from the second active position sensor, an output from the first automatic equipment identification system and an output with the second active position sensor and the analysis provides the track location and the identification of the first train asset and the second train asset.

* * * * *